Dec. 13, 1932.  E. H. BARTHEL  1,891,134
INDICATING APPARATUS
Filed Dec. 31, 1929

WITNESS
E. Lutz

INVENTOR
Erich H. Barthel
BY
A. B. Reavis
ATTORNEY

Patented Dec. 13, 1932

1,891,134

UNITED STATES PATENT OFFICE

ERICH H. BARTHEL, OF DARBY, PENNSYLVANIA, ASSIGNOR TO AIRCRAFT CONTROL CORPORATION, A CORPORATION OF PENNSYLVANIA

INDICATING APPARATUS

Application filed December 31, 1929. Serial No. 417,828.

The present invention relates to indicating apparatus, more particularly to a novel mounting for the mechanism thereof, and has for an object the provision of a novel and improved construction which is advantageous from the point of manufacture, adjustment and repair.

The invention is particularly adapted to be employed in indicating apparatus of the type utilizing the difference in dynamic and static pressures to indicate a measurable quantity as, for example, in aircraft air-speed indicators.

Air speed indicators are used to determine the relative speed of aircraft with respect to air. Ordinarily such instruments are provided with static and dynamic tubes or connections, that is, a Pitot arrangement, and a diaphragm, the diaphragm being subjected, on one side, to dynamic pressure, and, on the other side, to static pressure; and the movement of the diaphragm, which is a function of the relative speed of the craft to air, is transmitted to a suitable indicating element. Transmission mechanism for this purpose is usually arranged between spaced, parallel plates of a frame. In accordance with my invention, I provide a frame made in two parts, one part being a base plate member and the other part being a plate member arranged normally with respect to the base plate member and connected to the latter. The indicator element, the transmission and the spring are carried by the normal plate member and the diaphragm element is carried by the base plate member. The base plate member is connected to the bottom of a cup-shaped housing. The dynamic connection enters the diaphragm element through connecting passages formed in the housing bottom, the base plate member, and the bottom member of the diaphragm element; and the static connection communicates with the housing interior. This type of frame not only facilitates manufacture and assembly but it provides a rugged supporting structure for the parts of the mechanism. Due to its accessibility and position relative to parts of the mechanism, the normal plate member serves advantageously to provide for adjusting of the transmission and the zero setting. It is, therefore, an object of my invention to provide an air speed indicator having these advantageous features.

The aforementioned and other objects are effected by my invention as will be apparent from the following description and claims taken in connection with the accompanying drawing, in which:

Figure 1:
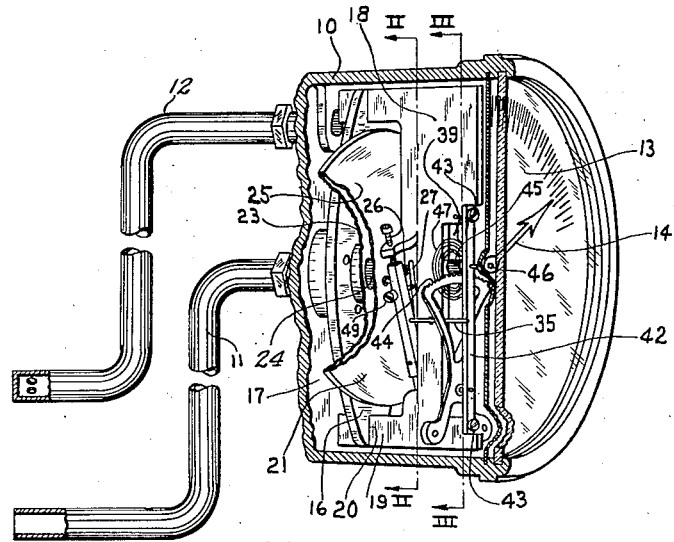
Fig. 1 is a sectional perspective view of my improved air speed indicator.
Figure 4:
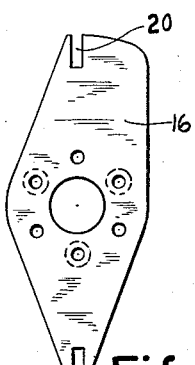
Fig. 4 is a detail view showing the base plate member of the frame.
Figure 5:
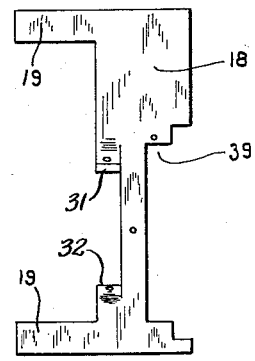
Fig. 5 is a detail view showing the normal plate member of the frame
Figure 2:
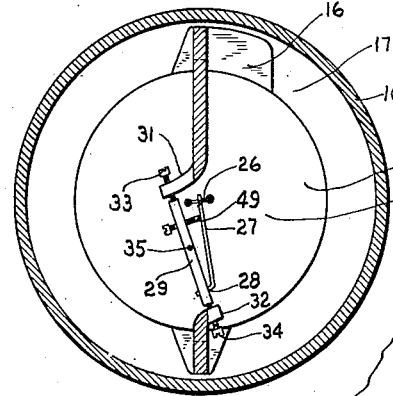
Fig. 2 is a sectional view taken along the line II—II of Fig. 1 and viewed in the direction of the arrows.

Referring to the drawing more in detail, I show an air speed indicator including a casing or cup-shaped housing 10, dynamic and static tubes or connections 11 and 12, respectively, connected to the casing, a dial 13, an indicator element or pointer 14 cooperating with the dial, and mechanism hereinafter described and responsive to forces due to dynamic and static pressure differences and to spring means for actuating the indicating element or pointer.

Arranged inside of the casing or cup-shaped housing 10, there is a frame consisting of a base plate or member 16 arranged parallel to and connected to the bottom 17 of the casing or housing and a plate or member 18 disposed normally with respect to the base plate or member 16 and connected to the latter. Preferably, the normal plate or member 18 has legs or tongues 19 fitting in slots 20 provided in terminal portions of the base plate member 16, the legs or tongues being soldered or brazed to the latter member.

A diaphragm structure or element 21 is carried by the base member 16 between the tongues or legs 19, the structure preferably consisting of a member 23 having an opening 24 communicating with the dynamic tube 11 and connected at its periphery to the periphery of an opposed displaceable member 25, the latter having suitable means, for example, a staple-like abutment 26 arranged to engage the rod 27 connected at one end, as indicated at 28, to the rock shaft or spindle 29. The normal plate member is provided with oppositely directed extending lugs or projections 31 and 32 having screw pintles 33 and 34, respectively, for the ends of the rock shaft or spindle. A normal plate 18 having the oppositely extending lugs or projections 31 and 32 may be readily formed in a die and punching machine. Opposite extension of the lugs or projections makes possible the inclination of the rock shaft or spindle 29 with respect to the normal plate member 18, whereby the region of engagement of the staple-shaped abutment 26 and the rod 27 may be located substantially centrally of the diaphragm structure or element 21.

The rock shaft 29 has a small diameter rod 35 extending substantially parallel to the normal plate member 18 and arranged to abut the inside wall 36 of the cut-out portion 37 of the oscillatory member 38 located in the cut-out space 39 in the normal plate member 18, the oscillatory member being carried by a spindle 41 pivoted to the bottom of the cut-out 39 and to the cover strip 42 connected by screws 43 to the normal plate member 18. The oscillatory member 38 is provided with a rack 44 meshing with a pinion 45 on the arbor 46, the latter having secured thereto the aforesaid hand or indicator element 14.

Movement of the diaphragm wall 25, as a result of an increase in differential pressure, causes the hand or indicator to move so as to indicate an increase in speed. On the other hand, with a decrease in pressure difference, the hair spring 47, having one end connected to the normal plate 18 and the other end to the arbor 46, causes the transmission to move so that the indicator element or hand 14 moves in a direction indicating decrease of speed.

Figure 3:
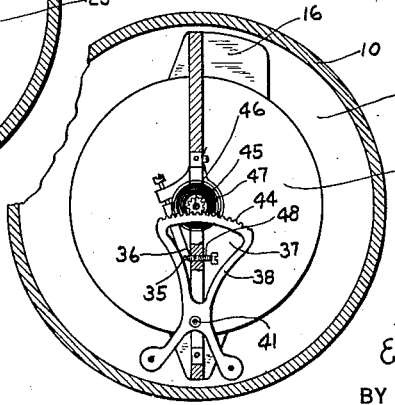
Fig. 3 is a sectional view taken along the line III—III of Fig. 1 and viewed in the direction of the arrows.

A screw 48 is carried by the normal plate member 18 and it engages the rod 35 (Fig. 3) in order that adjustment of the zero setting of the instrument may be made. This avoids the tedious and uncertain practice of bending the rod 35 to provide for this adjustment. To obtain a desired transmission ratio of diaphragm movement and movement of the indicator element or pointer 14, the rock shaft or spindle 29 is provided with a screw 49 abutting the flexible rod 27, whereby the distance of the latter from the rock shaft or spindle, and therefore the lever arm, may be varied.

From the foregoing, it will be apparent that I have provided an air speed indicator having an improved frame, which is simple in design, rugged, and capable of ready manufacture and assembly. The frame consists primarily of two main plate parts which may be readily punched or stamped from suitable stock, and the main parts are brought together in proper relation by a jig, the legs or tongues 19 fitting the slots 20, and then soldered or brazed. The normal plate member 18 makes possible the use of adjustments of the zero setting and of the transmission ratio between the diaphragm element or structure 21 and the indicator element or pointer 14, and the base plate member 16 not only serves as the immediate support for the diaphragm element or structure 21 but also as the means of attachment of the assembled frame to the bottom of the housing or casing.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Furthermore, while I have shown and described my invention as applied for air-speed indicating purposes, it will be apparent that my improved indicating apparatus may be used in any suitable situation where the difference in static and dynamic pressures may be utilized to indicate in a quantitative way a desired measurable property.

What I claim is:

1. In an air speed indicator having an indicating element operated by mechanism including a diaphragm element subject to dynamic and static pressures, the combination of a base plate member supporting the diaphragm element and provided with terminal slots and a plate member disposed normally to the base plate member and having legs fitting said slots and connected to the base plate member, said normal plate member supporting the remainder of said mechanism and said indicating element.

2. In indicating apparatus, a frame including a base plate member having opposed terminal slots and a plate member disposed normally with respect to the base plate member and having tongues secured in the terminal slots; an actuating device supported from the base plate member, and disposed in the space between the tongues; spaced lugs integral with the normal plate member; an indicating element; and means for transmitting motion from the actuating device to the indicating element including a rock shaft pivoted to the lugs.

3. In indicating apparatus, a casing, a frame in the casing and including a base plate member and a plate member disposed normally of and secured to the base plate member, actuating means carried by the base plate member and provided with a movable wall, spaced pivot means carried by the normal plate member, a rock shaft supported by the pivot means, means operated by the movable wall for rocking the rock shaft, an arbor carried by the normal plate member, an indicator connected to the arbor, and means carried by the normal plate member for transmitting motion from the rock shaft to the arbor.

4. In indicating apparatus, a casing, a frame in the casing and including a base plate arranged substantially parallel to the casing bottom and a plate arranged normally of and secured to the base plate, actuating means carried by the base plate and provided with a movable wall, spaced lugs integral with the normal plate, a rock shaft arranged between and pivoted to the lugs, means operated by the movable wall for rocking the rock shaft in one direction, an arbor carried by the normal plate, an indicator connected to the arbor, motion transmitting means between the rock shaft and the arbor and carried by the normal plate, and a spring connected to the arbor and to the normal plate and opposing the force applied to the arbor by the motion transmitting means.

5. In indicating apparatus, a casing, a frame in the casing and including a base plate and a plate disposed normally of and secured to the base plate, actuating means carried by the base plate and including a movable element, lugs carried by the normal plate, a rock shaft pivotally supported by the lugs, means operated by said element for rocking the rock shaft, an arbor carried by the normal plate, an indicator connected to the arbor, a pinion on the arbor, a toothed sector meshing with the pinion and pivotally mounted on the normal plate, and an arm carried by the rock shaft and abutting the sector to move the latter when the rock shaft is rocked by the diaphragm.

6. In indicating apparatus, a casing, a frame in the casing and including a base plate and a plate disposed normally of and secured to the base plate, means carried by the base plate and providing a chamber partly enclosed by a diaphragm, means for supplying pressure medium to the chamber, spaced lugs integral with and extending laterally from the normal plate, a rock shaft pivotally supported by the lugs, means operated by the diaphragm for rocking the rock shaft, an arbor carried by the normal plate, an indicator connected to the arbor, a pinion on the arbor, a toothed sector meshing with the pinion and pivotally mounted on the normal plate, an arm carried by the rock shaft and abutting the sector, a spring connected to the normal plate and to the arbor and whose force opposes movement of the arbor due to the diaphragm, and an adjustable abutment carried by the normal plate for limiting movement of the arbor, sector and rock shaft due to the spring.

7. In indicating apparatus, a casing, a frame in the casing and including a base plate and a plate disposed normally of and secured to the base plate, means carried by the base plate and providing a chamber partly enclosed by a diaphragm, means for supplying pressure medium to the chamber, spaced lugs carried by the normal plate, a rock shaft pivotally supported by the lugs, means operated by the diaphragm for rocking the rock shaft, an arbor carried by the normal plate, an indicator connected to the arbor, a pinion connected to the arbor, a toothed sector meshing with the pinion and pivotally mounted on the normal plate, an arm carried by the rock shaft and abutting the sector, a spring connected to the normal plate and to the arbor and whose force opposes movement of the arbor due to the diaphragm, and a screw carried by the normal plate for abutment with said arm to limit movement of the arbor, sector and rock shaft due to the spring.

8. In indicating apparatus, a casing, a frame in the casing and including a base plate and a plate disposed normally of and secured to the base plate, a pressure-operated diaphragm supported from the base plate, an abutment carried by the diaphragm, a pair of spaced lugs integral with and extending laterally in opposite directions from the normal plate, a rock shaft pivotally supported by the lugs, an arm carried by the rock shaft and abutting with said diaphragm abutment, means for varying the effective radius of said arm, an arbor carried by the normal plate, an indicator connected to the arbor, a pinion connected to the arbor, a toothed sector meshing with the pinion and pivotally mounted on the normal plate, a second arm carried by the rock shaft and abutting the sector, a spring connected to the normal plate and to the arbor and whose force opposes movement of the arbor due to the diaphragm, and a screw carried by the normal plate for abutment with said second arm to limit movement of the arbor, sector and rock shaft due to the spring.

9. A supporting structure for indicating instruments, comprising a base plate adapted to be secured to and within an instrument casing, a second plate disposed normally of and secured to the base plate, said second plate having a recess provided on the side adjacent the base plate to form a space for an actuating device adapted to be carried by said base plate, and means on said second plate and within the space thereof and forming a journal support for a rotatable shaft of the actuating device.

10. A supporting structure for indicating instruments, comprising a base plate, a second plate disposed normally of and secured to said base plate, said second plate having a recess on the side adjacent the base plate to provide space for an actuating device adapted to be carried by said base plate and means on said second plate for supporting a part of a mechanism of an actuating device which is adapted to be carried by the base plate.

In testimony whereof, I have hereunto subscribed my name this 24th day of December, 1929.

ERICH H. BARTHEL.